Patented Dec. 12, 1950

2,534,095

UNITED STATES PATENT OFFICE 2,534,095

HYDROCARBON COPOLYMERS AND USE THEREOF AS LUBE OIL ADDITIVE

David W. Young, Roselle, N. J., assignor to Standard Oil Development Company, a corporation of Delaware No Drawing. Application March 31, 1948, Serial No. 18,283

16 Claims. (Cl. 252—59)

This invention relates to novel hydrocarbon copolymers and to the preparation thereof, and to the use of such copolymers as additives in hydrocarbon oil solutions, particularly lubricating oils.

A number of different hydrocarbon polymers and copolymers, have been prepared for use as lubricating oil additives. One such material is polyisobutylene which has been prepared in molecular weights ranging from about 1,000 up to 200,000 and higher, by Friedel-Crafts polymerization of isobutylene at temperatures substantially below 0° C., such as at −40° C., the boiling point of propane, or at much lower temperatures such as −103° C., the boiling point of ethylene. Such isobutylene polymers have fairly good V. I. (viscosity index) improving characteristics, but the V. I. ceiling is about 132, meaning that no matter how much of the polymer is added to lubricating oil such as a paraffinic oil having a viscosity index of 112, the V. I. of the resulting blend cannot be raised above 132. For some purposes, such polymers are very suitable and are sufficiently stable in their viscosity characteristics, but for commercial applications where the lubricant is subject to substantial mechanical working, the high molecular weight polymer molecules appear to break down somewhat under the shearing action of the mechanical operation. Various attempts have been made to reduce this shear breakdown of the high molecular weight polymers.

According to the present invention isobutylene is copolymerized with a higher straight chained alpha-olefin of about 6 to 20 carbon atoms at a temperature between about −100° C. and about −10° C., in the presence of a Friedel-Crafts catalyst to make V. I.-improving copolymers of controlled molecular weight, preferably about 2,000 to 30,000, and better still about 10,000–20,000.

The higher normal alpha-olefin, should preferably have about 8 to 12 carbon atoms when the resulting copolymer is to be used essentially for its V. I. improving characteristics, but preferably about 12 to 18 carbon atoms if it is desired that the copolymer should have pour depressing properties. Examples of suitable alpha-olefins include octene-1; decene-1; dodecene-1; cetene; octadecene-1; etc.

The proportions of the reacting olefins should generally be about 1 to 25%, preferably 5 to 20%, of the higher alpha-olefin with about 75 to 99%, preferably 80 to 95% by volume of isobutylene (liquid phase).

Although it is not absolutely necessary to use a diluent, it is desirable, especially with the olefins higher than $C_{10}$, and when a diluent is used, the proportion should be about ½ to 5 volumes of diluent per volume of mixed olefin feed. Suitable diluents include propane, butane, pentane, hexane, as well as lower alkyl halides such as methyl chloride, ethyl chloride and the like.

The preferred catalyst is a solution of aluminum chloride in ethyl chloride or methyl chloride, using a concentration of about 0.5 to 5 grams per ml. of catalyst solution. Other catalysts may be used such as $BF_3$ or other Friedel-Craft catalysts. After the desired copolymerization has been effected, either by batch process or continuous operation, the resulting copolymer is separated from residual catalyst, by washing with water, alcohol, dilute aqueous caustic soda or other suitable hydrolyzing and washing medium, and the copolymer may be either used as such or separated into desired fractions by fractional precipitation, such as by adding isopropyl alcohol to a hexane solution of the polymer, or by high vacuum distillation to remove lower molecular weight molecules, or by any other suitable method.

The resulting hydrocarbon copolymer is generally semi-solid, tacky, clear, colorless copolymer having an average molecular weight of about 2,000 to 30,000, preferably about 10,000 to 20,000, as determined by the Staudinger method. This product has a low iodine number, generally below 1, and often below 0.1, good solubility in nonvolatile hydrocarbon oils such as mineral lubricating oils, hydraulic oils, etc., and is useful in paraffinic, naphthenic, mixed base or synthetic lubricating oils.

The amount of the copolymer to be used as oil additive, will depend on the purpose for which it is added, as well as upon the molecular weight and other characteristics of the copolymer per se, and upon the viscosity and other characteristics of the oil base stock to which it is added. Normally, however, the amount of polymer to be added to the oil should range from about 0.5 to 30%, preferably 1 to 10%, by weight, the lower range at about 0.5 to 5%, being usually sufficient when the polymer is to be used in lubricating oils, whereas the larger amounts ranging from about 5% to 30% are useful when the polymer is used for V. I. improving in hydraulic oils.

Other lube oil additives may be incorporated into the lubricating oil base stock along with the copolymers of this invention; such other additives may include dyes, antioxidants, lubricity agents, foam reducers, etc.

The copolymer of this invention is useful per se as an adhesive or bonding agent such as for making laminated sheet material, as it has good adhesion to smooth metal foil, glass, as well as fibrous sheet material such as paper, cloth, etc. One characteristic which emphasizes the difference between this copolymer and a polyisobutylene of substantially same molecular weight is that the present copolymer is soluble in benzene at temperatures at least as low as +6° C., whereas polyisobutylene of 5,000 to 30,000 molecular weight comes out of benzene solution when cooled down to +20° C. This particular characteristic makes this copolymer especially useful as a V. I. improver in relatively aromatic hydrocarbon oils which must remain fluid and homogeneous at low temperatures, for instance in either lubricating oils or hydraulic oils used in aviation where both high temperatures and low temperatures are encountered.

These copolymers are also useful as V. I. improvers or tackifiers in lubricating greases, such as those of the conventional oil-soap type. These copolymers may also be used in compounding with waxes, such as paraffin wax or petrolatum wax, asphalt, various resins, either natural or synthetic, particularly those of a hydrocarbon type such as the one made by copolymerizing 5 to 70% of styrene with 30 to 95% isobutylene at temperatures below −10° C. using a Friedel-Crafts catalyst, or a more brittle and unsaturated type of resin made by copolymerizing 65% of styrene with 35% of isoprene by emulsion or mass polymerization. It may also be compounded with other solid polymeric materials, such as polyisobutylene, particularly having a molecular weight above 100,000, polyethylene, natural and synthetic rubbers of various types, such as Butyl rubber of GR-I, made by polymerizing 97% of isobutylene with 3% of isoprene at −100° C., or an emulsion polymer of 75% butadiene and 25% of styrene or acrylonitrile.

The preferred modifications of the invention are made by copolymerizing isobutylene as the lower olefin, with a higher olefin of 8 to 12 carbon atoms, using preferably 10 to 20% by volume of said higher olefin.

The objects and advantages of the invention will be better understood from a consideration of the following experimental data.

EXAMPLE 1

5 ml. of n-octadecene-1 were mixed with 95 ml. of liquid isobutylene and 300 ml. of methyl chloride as solvent and diluent. This reaction mixture was cooled to −25° C. and was polymerized by adding 25 ml. of a catalyst solution containing 0.9 g. of $AlCl_3$ per 100 ml. of methyl chloride. The polymerization reaction took place readily and after reaction had ceased, alcohol was used to inactivate or hydrolyze the remaining catalyst, and after separation of the catalyst layer, the polymer solution was evaporated and stripped of solvent, and the residual polymer was washed with three 50-ml. portions of hot water, and dried. The product had a molecular weight of 2280. The yield of polymer was 96% by weight.

EXAMPLE 2

5 ml. of n-octene-1 and 95 ml. of liquid isobutylene were dissolved in 300 ml. of liquid ethane and polymerized at −89° C., using the same type of catalyst and same amount of catalyst as used in Example 1. The resulting copolymer had a molecular weight of 25,600. The yield of polymer was 97% by weight.

EXAMPLE 3

Example 2 was repeated except using 15% by volume of octene-1 and a copolymerization temperature of −25° C. The resulting copolymer had a molecular weight of 17,700. The yield of polymer was 92% by weight.

EXAMPLE 4

Example 3 was repeated except that 25% by volume of octene-1 was used. The resulting copolymer had a molecular weight of 4280. The yield of polymer was 91% by weight.

EXAMPLE 5

5 ml. of n-decene-1 and 95 ml. of liquid isobutylene were diluted with 300 ml. of liquid ethane and copolymerized at a temperature of −89° C., using as catalyst a solution of $AlCl_3$ in methyl chloride (0.8 g. $AlCl_3$ per 100 ml.). The resulting copolymer had a molecular weight of 24,434. The yield of polymer was 93% by weight.

EXAMPLE 6

Example 5 was repeated except that 15% of decene-1 was used instead of 5%. The resulting copolymer had a molecular weight of 14,310. The yield of polymer was 92% by weight.

EXAMPLE 7

25 ml. of n-decene-1 and 75 ml. of liquid isobutylene were diluted with 300 ml. of methyl chloride and copolymerized at −25° C., using a solution of $AlCl_3$ in methyl chloride as catalyst. The resulting copolymer had a molecular weight of 5170. The yield of polymer was 89% by weight.

EXAMPLE 8

25 ml. of n-octadecene-1 and 75 ml. of liquid isobutylene were diluted with 300 ml. of ethyl chloride and copolymerized at −75° C., using solidified $CO_2$ as internal refrigerant and using 35 ml. of a solution of 2.2% of $AlCl_3$ in ethyl chloride as catalyst. At the end of the reaction 50 ml. of isopropyl alcohol were added to stop the reaction. The yield of copolymer was 89% by weight and it had a molecular weight of 3280.

This copolymer in addition to showing V. I. properties as indicated in the table here below, also showed pour depressing properties when blended in small concentrations in a Pennsylvania neutral oil having a viscosity of about 42 seconds Saybolt at 210° F., an A. S. T. M. pour point of +30° F. and a cloud point of 32° F. A blend of this oil containing 3% of the copolymer had a pour point of −20° F. and with 6% of the copolymer a pour point of −15° F.

An engine test showed that a blend of extracted Mid-continent lubricating oil having a V. I. of 5.5 centistokes at 210° F. and a V. I. of 101, containing 12% by weight of the copolymer of Example 8 reduced the viscosity from 71.9 to 69.9 seconds Saybolt Univ. at 210° F. after 17 hours running in the engine. For comparison, it is noted that a similar blend of a polybutene of same molecular weight (3280) reduced the viscosity from 71.9 to 67.4 S. S. U. at 210° F. This indicates that the copolymer of 25% octadecene-1 and 75% isobutylene has much greater stability against shear breakdown than simple polybutene of the same molecular weight.

EXAMPLE 9

5 ml. of n-octadecene-1 and 95 ml. of liquid propylene were diluted with 300 ml. of methyl chloride and copolymerized at −50° C., using solidified $CO_2$ as internal refrigerant and using as catalyst a solution of $AlBr_3$ in methyl chloride (concentration about 8 grams $AlBr_3$ per 100 ml. methyl chloride). The copolymerization reaction was good and gave a yield of 98%. The resulting copolymer had a molecular weight of 2330 and was quite soluble in a highly paraffinic solvent extracted lubricating oil having a viscosity of 43 seconds Saybolt at 210° F.

Viscosity index improving characteristics of a number of the copolymers described in the above examples are summarized in the following table, which also gives the viscosity characteristics of the oil base stock A, used in tests 1 to 7, which was a highly paraffinic solvent extracted lubricating oil having a viscosity of about 43 seconds Saybolt Universal at 210° F., and also gives for comparison the corresponding viscosity data on blends of polybutene of two different molecular weights and oil base stock B, used in test 8, which was a Pennsylvania neutral oil having a viscosity of about 42 seconds Saybolt at 210° F. and having a viscosity index of 101.

Table

| Ex. | Per Cent i-$C_4H_8$ | Higher Olefin | | Mol. Wt. | Per Cent Polymer in Oil | Viscosity, Centistokes | | V. I. |
|---|---|---|---|---|---|---|---|---|
| | | Per Cent | No. of C's | | | 100° F. | 210° F. | |
| A | | | | | 0 | | 5.6 | 112 |
| 1 | 95 | 5 | 18 | 2,280 | 3 | 40.1 | 6.6 | 125.0 |
| | | | | | 6 | 46.8 | 7.0 | 115.0 |
| 3 | 85 | 15 | 8 | 17,700 | 3 | 104.5 | 16.0 | 138.5 |
| | | | | | 6 | 275.9 | 38.6 | 135.0 |
| 4 | 75 | 25 | 8 | 4,280 | 3 | 45.0 | 7.1 | 124.0 |
| | | | | | 6 | 61.8 | 9.3 | 129.0 |
| 6 | 85 | 15 | 10 | 14,310 | 3 | 76.5 | 12.1 | 138.0 |
| | | | | | 6 | 194.8 | 27.6 | 136.5 |
| 7 | 75 | 25 | 10 | 5,170 | 3 | 47.0 | 7.5 | 129.0 |
| | | | | | 6 | 62.9 | 9.5 | 130.0 |
| | 100 | | | 5,000 | 3 | | 8.0 | 125 |
| | | | | | 6 | | 9.0 | 126 |
| | 100 | | | 12,000 | 3 | | 11.0 | 130 |
| | | | | | 6 | | 14.6 | [1] 132 |
| | | | | | Kinematic | | | |
| B | | | | | 0 | 29.8 | 4.99 | 101 |
| 8 | 75 | 25 | | | 3 | 36.9 | 6.29 | 127 |
| | | | | | 6 | 47.2 | 8.39 | 142 |

[1] Ceiling.

The above table shows that the copolymers of 5 to 25% of a higher straight chain alpha olefin ranging from octene-1 to octadecene-1 with isobutylene or propylene, has good viscosity index improving properties, particularly for a given increase in viscosity at 210° F. It is desirable of course to obtain the greatest increase in viscosity index with the least amount of actual thickening of the oil. For instance, the copolymer of Example 1, which in 3% concentration gave a V. I. of 125 is superior to a polybutene of 5000 molecular weight which gave the same V. I. of 125, because the copolymer only raised the 210° F. viscosity of the oil from 5.6 to 6.6 centistokes, whereas the polybutene raised it to 8.0. Furthermore, the copolymers in Examples 3 and 6, which both contained 15% of the higher olefin, produced blends having a V. I. of 138 which is considerably higher than the V. I. ceiling of 132, the maximum obtainable with polybutene.

Example 8 was, as indicated, tested in comparison with a different lubricating oil base stock, having a V. I. of 101 instead of the 112 V. I. of the oil base stock used in studying the viscosity index characteristics of the polymers of the preceding examples. The copolymer of Example 8 gave a V. I. of 127 in 3% concentration and 142 in 6% concentration, both of these being relatively greater improvements than those of the preceding copolymers. The reason for this superiority is not well understood but is believed to be because of the novel chemical structure and solubility property in oil. This copolymer has a structure that is associated in solution at 100° F., therefore it does not thicken to a great extent. However, at 210° F. it becomes non-associated in oil and thickens to a very great extent. Result is high V. I.

It is not intended that this invention be limited to the specific examples of materials and reaction conditions, etc. which have been given merely for the sake of illustration but in the appended claims it is intended to claim all modifications coming within the scope and spirit of the invention.

What is claimed is:

1. Product consisting essentially of a copolymer of about 75% to 99% by volume of isobutylene and about 1% to 25% by volume of a higher normal alpha olefin of 6 to 20 carbon atoms, said copolymer being a semi-solid tacky substance having an average molecular weight of about 2,000 to 30,000 and having an iodine number below 1.

2. Product consisting essentially of a semi-solid tacky hydrocarbon copolymer of about 1 to 25% by volume of a higher normal alpha olefin of about 8 to 18 carbon atoms, with about 75 to 99% by volume of isobutylene, said copolymer having an average molecular weight of about 2,000 to 30,000 and an iodine number below 1.

3. Product consisting essentially of a semi-solid tacky hydrocarbon copolymer of about 5 to 20% by volume of n-octene-1 and 80 to 95% by volume of isobutylene, said copolymer having an average molecular weight of about 2,000 to 30,000 and having an iodine number less than 1.

4. Product consisting essentially of a semi-solid tacky hydrocarbon copolymer of about 5 to 20% by volume of n-octadecene-1 and 80 to 95% by volume of isobutylene, said copolymer having an average molecular weight of about 2,000 to 30,000 and having an iodine number less than 1.

5. Product consisting essentially of a semi-solid, tacky, clear, colorless hydrocarbon copolymer of about 15% by volume of n-octene-1 and 85% by volume of liquid phase volume of isobutylene, said copolymer having an average molecular weight of about 10,000 to 20,000 and an iodine number less than 1.

6. Process comprising copolymerizing about 75% to 99% by volume of isobutylene with about 1% to 25% by volume of a higher normal alpha olefin of 6 to 20 carbon atoms at a temperature of about —100° C. to —10° C. in the presence of a Friedel-Crafts catalyst.

7. Process comprising essentially copolymerizing about 1 to 25% by volume of higher normal alpha olefin of 8 to 18 carbon atoms with 75 to 99% by volume of liquid isobutylene at a temperature of —100° C. to —10° C. in the presence of a Friedel-Crafts catalyst.

8. Process comprising essentially copolymerizing about 5 to 20% by volume of higher normal alpha olefins of 8 to 18 carbon atoms with 80 to 95% by volume of liquid isobutylene in the presence of ½ to 5 volumes of inert diluent per volume of mixed reactants, and in the presence of a Friedel-Crafts catalyst at a temperature between —100° C. and —10° C.

9. Process according to claim 8 in which the catalyst is a solution of aluminum chloride in a lower alkyl halide.

10. Process consisting essentially of copolymerizing 5 to 20% by volume of n-octene-1 with 80 to 95% by volume of liquid isobutylene in the presence of ½ to 5 volumes of inert diluent, using as catalyst a solution of aluminum chloride in methyl chloride, at a temperature between —100° C. and —10° C.

11. Composition comprising a major proportion of a substantially non-volatile hydrocarbon oil and about 0.5% to 30.0% by weight of a semi-solid hydrocarbon copolymer of about 75% to 99% by volume of liquid phase isobutylene with 1% to 25% by volume of a higher normal alpha olefin of 6 to 20 carbons atoms, said copolymer having an average molecular weight of about 2,000 to 30,000.

12. Composition comprising a major proportion of a substantially non-volatile hydrocarbon oil and a minor but viscosity index improving amount of a semi-solid hydrocarbon copolymer of about 1 to 25% by volume of a higher normal alpha olefin of 8 to 18 carbon atoms with 75 to 99% by liquid phase volume of isobutylene, said copolymer having an average molecular weight of about 2,000 to 30,000 and an iodine number of less than 1.

13. Composition comprising a major proportion of mineral lubricating oil and about 1 to 10% by weight of a semi-solid hydrocarbon copolymer of about 5 to 20% by volume of higher normal alpha olefin of 8 to 18 carbon atoms with 80 to 95% by liquid phase volume of isobutylene, said copolymer having an average molecular weight of about 10,000 to 20,000 and an iodine number less than 1.

14. Composition according to claim 13 in which the higher olefin is n-octene-1.

15. Composition according to claim 13 in which the higher olefin is n-octadecene-1.

16. Composition according to claim 13 in which the additive is a copolymer of 10 to 15% of the higher olefin with 85 to 90% of isobutylene.

DAVID W. YOUNG.

REFERENCES CITED

The following references are of record in the file of this patent:

UNITED STATES PATENTS

| Number | Name | Date |
|---|---|---|
| 2,142,980 | Huijzer | Jan. 3, 1939 |
| 2,274,031 | Bannon | Feb. 24, 1942 |
| 2,327,705 | Frolich | Aug. 24, 1943 |
| 2,387,543 | Thomas | Oct. 23, 1945 |
| 2,387,784 | Thomas | Oct. 30, 1945 |
| 2,408,798 | Meinert | Oct. 8, 1946 |
| 2,410,381 | Jenkins | Oct. 29, 1946 |

FOREIGN PATENTS

| Number | Country | Date |
|---|---|---|
| 513,169 | Great Britain | Oct. 5, 1939 |